3,671,376
METHOD FOR PRODUCING FLAME-RETARDANT
PLYWOODS
Takayoshi Okazaki, Kiroku Tashiro, and Koichiro Yanagida, Tokyo, Japan, assignors to Nissan Chemical Industries, Ltd., Tokyo, Japan
No Drawing. Filed Apr. 10, 1970, Ser. No. 27,428
Claims priority, application Japan, June 30, 1969, 44/51,030
Int. Cl. B32b 9/06, 21/14
U.S. Cl. 161—165
10 Claims

ABSTRACT OF THE DISCLOSURE

A method for rendering plywood flame-retardant using a difficulty-soluble phosphate whereby in a first embodiment, a paper sheet, plastic film or wooden sheet is bonded to the plywood with an adhesive containing said difficulty-soluble phosphate and in a second embodiment, a paper sheet is impregnated with said difficultly-soluble ammonium polyphosphate and is bonded to said plywood.

BACKGROUND OF THE INVENTION

Field of the invention

The present invention relates to a method for producing a flame-retardant plywood, and a flame-retardant product produced therefrom.

Description of prior art

The term "flame-retardant plywood" as used in the present specification, refers to a multi-layered plywood laminate which will not be readily burned when subjected to flame contact and which can pass the Japanese Agricultural Standard (JAS) flame-retardant test for plywood. The term "flame-retarding agent" is intended to refer to a material which is capable of imparting good flame-retardant properties to a combustible material when properly applied.

Although a wide variety of flame-retardant plywoods are presently available, the majority of these products are usually prepared by a technique involving impregnation of the plywood with a conventional flame-retarding agent such as ammonium phosphate or ammonium bromide. There are many difficulties, however, inherent in these state-of-the-art techniques which have rendered these techniques comparatively expensive and have limited the extent of use of plywoods produced by these methods.

One of the principal difficulties in the state-of-the-art techniques has been that impregnation processes generally require a considerable period of time and hence the movement of the plywood through the standard mechanized processing and conveying apparatus must be interrupted to effect acceptable impregnation. Since the impregnation processes must be conducted separately from the conveying systems, the costs of labor and production are substantially increased and the cost of the final product is correspondingly increased.

Another difficulty with the state-of-the-art impregnation techniques is that the flame-retarding agent will often be unevenly deposited into the plywood so that consistent flame-retardant properties will not be imparted throughout the material. Moreover, depending upon the particular flame-retarding agent used, the plywood may become hygroscopic so that nails used in the plywood will more readily accumulate rust deposits.

SUMMARY OF THE INVENTION

Accordingly, it is an object of the present invention to apply a flame-retarding agent to plywood in a manner such that the use of ordinary processing and conveying systems do not have to be interrupted.

Another object of the present invention is to provide a flame-retardant plywood at minimum cost, yet which is characterized by a high degree of flame-retardant properties.

Still another object of the present invention is to provide a flame-retardant plywood characterized by excellent flame-retardant properties.

These and other objects have now herein been attained by the discovery that when a flame-retarding agent is present in a high concentration at the plywood surface, excellent flame-retardant properties can be obtained as compared with plywood impregnated with a flame-retarding agent. In the present invention therefore, flame-retardant properties are imparted to the plywood by treating only the outside veneer or outside ply of the laminate with the flame-retarding agent.

DETAILED DESCRIPTION OF PREFERRED EMBODIMENTS

The flame-retarding agent can be applied to the outside veneer by any one of a variety of techniques including impregnating the outside veneer with a flame-retarding agent, adhering a cover layer such as a paper sheet, plastic film or wooden film to the outside veneer or ply with an adhesive containing the flame-retarding agent, or adhering a paper sheet or the like which has been impregnated with the flame-retarding agent to the outside veneer or ply.

Although good results are obtainable when the outside veneer is impregnated with the flame-retarding agent, since the outside veneer is generally quite thin, usually only about 0.5 to 0.1 mm., it is frequently difficult to impregnate this veneer with the flame-retarding agent in sufficiently high concentration to provide good flame-retardant properties. Moreover, it is extremely difficult to impregnate this veneer evenly with a high concentration of flame-retarding agent, and accordingly this technique is not as desirable as the other techniques of this invention.

When applying the flame-retarding agent in the form of an adhesive mixture for bonding a cover layer to the outside veneer, has been found that when conventional flame-retarding agents, such as monoammonium phosphate, ammonium bromide, or ammonium chloride is used, the flame-retarding agent tends to solidify the adhesive due to its water solubility and acidic nature. Use of conventional agents with the adhesive therefore tends to reduce the quality of the adhesive, and renders the adhesive water-degradable. It has been found, however, that these difficulties can be alleviated by use of a flame-retarding agent which is difficultly-soluble, such as ammonium polyphosphate, represented by the general formula

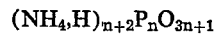

$$(NH_4,H)_{n+2}P_nO_{3n+1}$$

wherein $n$ is the degree of average polymerization and is greater than 15. The ammonium polyphosphate is sparingly soluble or difficultly-soluble in water and the pH of an aqueous solution of ammonium polyphosphate is close to neutral. When this flame-retarding agent is used in admixture with the adhesive, therefore, the aforementioned difficulties are avoided.

In order to demonstrate the effectiveness of the present invention, the following test procedure was followed, with the following results:

TEST PROCEDURE

Flame-retardant plywoods were prepared by bonding red lauan three-layer plywood having a thickness of 4 mm. to a variable thickness board using an adhesive containing an ammonium polyphosphate. The plywood was tested in accordance with the procedures provided by the Japanese Agricultural Standard flame-retardant test for plywood. For each test, the following measurements were made: the temperature of the back surface of the test piece, the flame contact time, the embers time, the degree of deformation of the plywood as the test piece was heated to a temperature at 1 centimeter from the surface of 500° C. after 390 seconds. The test results of this procedure are shown in the following table which describes surface flame time and surface flame temperature.

| Test Sample | | Surface flash | | Surface flaming | | | | | | | |
|---|---|---|---|---|---|---|---|---|---|---|---|
| G | H | Time | Surface temperature, °C. | Time | Surface temperature, °C. | A | B | C | D | E | F |
| J | | | | | | | 30" | 2' | 350 | Good | Passed. |
| 1 | 40 | 0.1 | 6'00" | 440 | 6'15" | 470 | 15" | 40" | 40" | 135 | I | Rejected. |
| 2 | 40 | 0.3 | 5'20" | 370 | 5'30" | 380 | 60" | 45" | 45" | 147 | I | Do. |
| 3 | 40 | 0.5 | None | | 5'30" | 380 | 60" | 40" | 40" | 155 | I | Do. |
| 4 | 45 | 0.1 | 5'50" | 430 | 6'15" | 470 | 15" | 20" | 20" | 128 | Good | Passed. |
| 5 | 45 | 0.3 | 5'20" | 370 | 6'15" | 470 | 25" | 28" | 28" | 140 | do | Do. |
| 6 | 45 | 0.5 | 5'30" | 380 | 5'45" | 430 | 45" | 45" | 45" | 147 | do | Rejected. |
| 7 | 50 | 0.1 | 6'00" | 440 | 6'30" | 500 | None | 20" | 20" | 140 | do | Passed. |
| 8 | 50 | 0.3 | 5'30" | 400 | 6'20" | 480 | 10" | 20" | 20" | 135 | do | Do. |
| 9 | 50 | 0.5 | 5'00" | 320 | 5'40" | 410 | 45" | 35" | 35" | 124 | do | Rejected. |
| 10 | 55 | 0.1 | None | | None | | None | None | None | 120 | do | Passed. |
| 11 | 55 | 0.3 | 6'15" | 470 | None | | None | None | None | 130 | do | Do. |
| 12 | 55 | 0.5 | 4'50" | 300 | 6'20" | 480 | 10" | 35" | 35" | 145 | do | Rejected. |

NOTE.—A = Continuous flame until 6'30"; B = Flame-remaining time; C = Embers remaining time; D = Back surface temperature (° C.); E = State of heated sample; F = Evaluation; G = Amount of ammonium polyphosphate per/m.²; H = Thickness of surface layer (mm.); I = Slightly deformed; J = Standard.
Mark ' indicates minute; Mark " indicates second.

From the above results, and from other examination results, it has been found that the following conditions are required in order to provide an acceptable flame-retardant plywood:

(1) The quantity of the ammonium polyphosphate added to the adhesive must be greater than 45 grams per m.².

(2) The thickness of the surface layer of the plywood bonded to the adhesive layer must be less than 0.3 mm.

When preparing a three-layer plywood having a thickness of 3 mm., wherein the thickness of the ammonium polyphosphate containing adhesive layer is about 0.5 to 0.8 mm., ignition of the surface of the plywood cannot be prevented and the fire will be extinguished only at the surface of the adhesive layer so that the flame retardation is unsatisfactory.

Since the polyphosphate used in the present invention is inactive to most adhesives, the adhesive may be selected according to its bonding ability between the veneer and the particular covering material.

As indicated above, a paper impregnated with the ammonium polyphosphate may be bonded to the surface of the plywood to provide similar outstanding flame-retarding properties. This can be conveniently accomplished by applying the impregnated paper to the surface of the plywood using heat and pressure. If desired, the ammonium polyphosphate can be used to impregnate any type of covering material including paper, plastic film or wooden film, and the cover layer can be bonded to the outside veneer using any suitable adhesive.

Having generally described the invention, a further understanding can be obtained by reference to certain specific examples which are provided herein for purposes of illustration only and are not intended to be limiting in any manner.

EXAMPLE 1

In a continuous process for preparing plywood, a urea resin-type adhesive containing ammonium polyphosphate was uniformly applied to the surface of a three-layer red lauan plywood having a thickness of 4 mm. which was cold pressed. The quantity of adhesive used was 200 g. per square meter, and the proportion of the phosphate contained in the adhesive was 55 g. A patterned paper having a thickness of 0.1 mm. was superimposed on the adhesive layer of the plywood and the assembly was hot pressed. The plywood thus treated was thereafter cut to desired size.

The bonding properties of the adhesive and the water resistance of the product were excellent as compared to conventional plywood. This material was then subjected to the above-described JAS flame-retarding plywood test which showed that the surface of the plywood was carbonized without flash ignition. The flame remaining time and the embers remaining time were zero and the back surface of the test piece was 120° C. These results were sufficient to establish the plywood as a flame-retardant type plywood according to the standards of JAS.

EXAMPLE 2

A flame-retardant paper containing 55 g. per square meter of ammonium polyphosphate was impregnated with a urea resin solution and applied to the surface of a three-layer red lauan plywood board having a thickness of 4 mm.

The plywood thus prepared was characterized by excellent adhesive properties and excellent water resistant properties as compared with conventional plywoods.

The results of the heat test according to the JAS flame-retardant test for plywood showed that only the surface of the plywood was carbonized without flash ignition. The flame remaining time and the ember remaining time were essentially zero. The back surface temperature was 130° C. which results established this plywood as an acceptable flame-retardant plywood according to the JAS standards.

Using the techniques of the present invention, flame-retardant plywoods can be produced continuously by a conveyor system thereby substantially reducing the production cost of flame-retardant plywoods. When either the technique of bonding a cover sheet to the plywood using a flame-retardant adhesive or the technique of impregnating a paper cover layer with flame-retarding agent is used, flame-retarding properties can be imparted to the plywood without interrupting conventional conveyor systems. Accordingly, the costs of labor can be reduced while the output quantity of product can be increased. When using the techniques of the present invention, the production cost of flame-retardant plywoods can be reduced as compared with conventional techniques. Moreover, a wide variety of problems normally experienced in rendering plywood flame-retardant, can be overcome by the methods of this invention. Particularly, the quality of the flame-retardant plywood is substantially enhanced as compared with conventional plywoods.

Having fully described the invention, it will be apparent to one of ordinary skill in the art that many changes and modifications can be made without departing from the spirit and scope thereof. Accordingly, what is claimed and intended to be covered by Letters Patent is:

1. A flame-retardant plywood which comprises a paper, plastic film or wood film cover layer having a thickness of less than 0.3 mm. which is adhered to the outermost veneer of said plywood with an adhesive containing a difficultly-water soluble ammonium polyphosphate having a mean polymerization degree of greater than 15, in an amount of greater than 45 grams of polyphosphate per square meter of plywood veneer.

2. A flame-retardant plywood which comprises the combination of an ammonium polyphosphate-impregnated paper sheet having a thickness of less than 0.3 mm. and being impregnated with an amount of greater than 45 grams per square meter of said polyphosphate having a mean polymerization degree of greater than 15, which is adhered to the outermost veneer of said plywood.

3. A method for imparting flame-retardant properties to a plywood laminate which comprises bonding a paper, plastic film or wooden film cover layer having a thickness of less than 0.3 mm. to the surface of the outermost veneer of said plywood with an adhesive which contains a difficultly water soluble ammonium polyphosphate having a mean polymerization degree of greater than 15, in an amount of more than 45 grams of polyphosphate per square meter of said outermost plywood veneer.

4. The method of claim 3, wherein said cover layer is selected from the group consisting of paper.

5. The method of claim 3, wherein said flame-retardant plywood is produced continuously by a conveyor system.

6. The method of claim 3, wherein said cover layer is a plastic film.

7. The method of claim 3, wherein said cover layer is a wooden film.

8. A method for imparting flame-retardant properties to a plywood laminate which comprises bonding a paper sheet which has been impregnated with a difficultly-water soluble ammonium polyphosphate having a mean polymerization degree of greater than 15, said sheet having a thickness of less than 0.3 mm. and being impregnated with an amount of greater than 45 grams per square meter of said polyphosphate having a mean polymerization degree of greater than 15 to the surface of the outermost veneer of said plywood.

9. The method of claim 8, wherein said polyphosphate is impregnated into said paper sheet and said paper sheet is bonded to said plywood surface by hot pressing.

10. The method of claim 8, wherein said flame-retardant plywoods are produced continuously using a conveyor system.

References Cited

UNITED STATES PATENTS

| | | | |
|---|---|---|---|
| 72,830 | 12/1867 | Fell | 117—138 |
| 2,444,918 | 7/1948 | Cone | 156—324 |
| 2,545,603 | 3/1951 | Byers et al. | 156—60 |
| 2,656,296 | 6/1951 | Grangaard | 161—261 |
| 2,958,577 | 11/1960 | Arvan | 23—106 A |
| 2,994,620 | 8/1961 | Franck et al. | 117—138 |
| 3,152,029 | 10/1964 | Orloff | 161—261 |
| 3,171,733 | 3/1965 | Hignett et al. | 23—106 A |
| 3,300,361 | 1/1967 | Brown | 161—261 |
| 3,372,131 | 3/1968 | Rohlfse et al. | 161—263 |
| 3,498,877 | 3/1970 | Christoffersen et al. | 161—261 |
| 2,602,037 | 7/1952 | Nelb | 260—869 |
| 3,061,492 | 10/1962 | Singleton et al. | 161—191 X |
| 3,397,035 | 8/1968 | Shen et al. | 23—106 |
| 3,495,937 | 2/1970 | Shen | 23—106 |
| 3,562,197 | 2/1971 | Sears et al. | 23—106 |

FOREIGN PATENTS

| | | | |
|---|---|---|---|
| 17,434 | 5/1903 | Great Britain | 117—138 |
| 605,700 | 9/1960 | Canada | 117—138 |

ROBERT F. BURNETT, Primary Examiner

D. J. FRITSCH, Assistant Examiner

U.S. Cl. X.R.

117—137, 138; 156—60, 335; 161—191, 268, 270, 403